(12) United States Patent
Takimoto et al.

(10) Patent No.: US 12,323,002 B2
(45) Date of Patent: Jun. 3, 2025

(54) MOTOR-DRIVEN COMPRESSOR AND METHOD FOR MANUFACTURING MOTOR-DRIVEN COMPRESSOR

(71) Applicant: KABUSHIKI KAISHA TOYOTA JIDOSHOKKI, Kariya (JP)

(72) Inventors: Shuji Takimoto, Kariya (JP); Taku Adaniya, Kariya (JP); Kensuke Ikai, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 451 days.

(21) Appl. No.: 17/959,733

(22) Filed: Oct. 4, 2022

(65) Prior Publication Data

US 2023/0107796 A1    Apr. 6, 2023

(30) Foreign Application Priority Data

Oct. 6, 2021 (JP) .................................. 2021-165056
Mar. 9, 2022 (JP) .................................. 2022-036087

(51) Int. Cl.
| | |
|---|---|
| H02K 1/16 | (2006.01) |
| F04D 13/06 | (2006.01) |
| H02K 3/12 | (2006.01) |
| H02K 5/04 | (2006.01) |
| H02K 15/02 | (2025.01) |
| H02K 15/021 | (2025.01) |

(52) U.S. Cl.
CPC ........... *H02K 1/16* (2013.01); *F04D 13/0693* (2013.01); *H02K 3/12* (2013.01); *H02K 5/04* (2013.01); *H02K 15/021* (2025.01)

(58) Field of Classification Search
None
See application file for complete search history.

(56) References Cited

U.S. PATENT DOCUMENTS

| 7,531,936 B2 | 5/2009 | Fukasaku et al. |
| 9,404,503 B2 | 8/2016 | Watanabe et al. |

(Continued)

FOREIGN PATENT DOCUMENTS

| JP | 2006-333581 A | 12/2006 |
| JP | 2012-144997 A | 8/2012 |

*Primary Examiner* — Bernard Rojas
(74) *Attorney, Agent, or Firm* — Sughrue Mion, PLLC (57) ABSTRACT

A motor-driven compressor with a housing and an electric motor includes a stator that includes a stator core including a yoke and teeth, an insulator including an insulator base in contact with an end face of the yoke, and three-phase windings, each being wound around the corresponding teeth in a concentrated manner so as to form coils. The winding of each phase forms connection wires locked on an outer circumferential surface of the insulator base. Each connection wire connects adjacent coils of the corresponding phase. The outer circumferential surface includes a locking surface including accommodation grooves, each accommodating the corresponding connection wire, and a non-locking surface that does not lock the connection wires. The stator core includes an engagement recess that engages with part of a jig. The engagement recess is located radially outward from the insulator base on the end face and located radially outward from the non-locking surface.

5 Claims, 7 Drawing Sheets

(56) References Cited

U.S. PATENT DOCUMENTS

| | | | |
|---|---|---|---|
| 2023/0208231 A1* | 6/2023 | Suzuki | H02K 3/522 310/71 |
| 2023/0208240 A1* | 6/2023 | Hori | H02K 3/12 310/214 |
| 2025/0038608 A1* | 1/2025 | Miyata | H02K 3/522 |

* cited by examiner

MOTOR-DRIVEN COMPRESSOR AND METHOD FOR MANUFACTURING MOTOR-DRIVEN COMPRESSOR

FIELD

The present disclosure relates to a motor-driven compressor and a method for manufacturing the motor-driven compressor.

DESCRIPTION OF RELATED ART

Japanese Laid-Open Patent Publication No. 2012-144997 discloses an example of a motor-driven compressor including a compression portion, an electric motor, and a tubular housing. The compression portion compresses fluid. The electric motor drives the compression portion. The housing accommodates the electric motor.

The electric motor includes a stator. The stator includes an annular stator core. The stator core is fixed to an inner circumferential surface of the housing. The stator core includes teeth and a cylindrical yoke. The yoke engages with the inner circumferential surface of the housing. The teeth are spaced apart from each other in a circumferential direction of the yoke, and extend from an inner circumferential surface of the yoke in a radial direction of the yoke. The stator includes U-, V-, and W-phase windings. The winding of each phase is wound around the corresponding teeth in a concentrated manner to form coils.

For example, the coils of each phase may be formed in series to deal with high voltage. In a series winding, first, the winding of each phase starts to be wound around the corresponding tooth. Then, the winding of each phase is wound around the teeth corresponding that phase. The teeth corresponding to each phase are arranged such that two other teeth are located between them in the circumferential direction of the yoke. The winding of each phase is sequentially wound around the teeth corresponding to that phase in a concentrated manner. Thus, the coils of each phase are formed by winding the winding around the teeth corresponding to that phase in a concentrated manner. Additionally, the stator includes an insulator. The insulator includes a tubular insulator base. The insulator base is in contact with an end face of the yoke.

The winding of each phase forms connection wires that connect adjacent ones of the coils of the corresponding phase. The connection wires are locked on an outer circumferential surface of the insulator base.

The stator is coupled to the housing by fitting the stator core to the inner circumferential surface of the housing through, for example, shrink-fitting. In the shrink-fitting, the housing is thermally expanded so that the inner diameter of the housing becomes larger than the outer diameter of the stator core. Subsequently, the stator core is inserted into the housing to reach a predetermined shrink-fitting position. Then, as the temperature of the housing becomes closer to normal temperature, the housing shrinks. This brings the inner circumferential surface of the housing into close contact with the outer circumferential surface of the stator core.

In the case of, for example, shrink-fitting the stator core to the housing, a jig is used to position the stator core relative to the housing in a circumferential direction of the stator core such that no phase deviation occurs in the stator core relative to the housing. With the phase of the stator core relative to the housing determined, the stator core is inserted into the housing to reach the predetermined shrink-fitting position. If connection wires are located at a portion into which a jig is to be inserted, the connection wires will interfere with the jig. This lowers the efficiency of coupling the stator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A motor-driven compressor according to an aspect of the present disclosure includes a compression portion configured to compress fluid, an electric motor configured to drive the compression portion, and a tubular housing that accommodates the electric motor. The electric motor includes a stator. The stator includes an annular stator core including a cylindrical yoke that engages with an inner circumferential surface of the housing and teeth that extend in a radial direction from an inner circumferential surface of the yoke, an annular insulator including a tubular insulator base that is in contact with an end face of the yoke, and U-, V-, and W-phase windings, each being wound around corresponding ones of the teeth in a concentrated manner so as to form coils. The winding of each of the phases forms connection wires that are locked on an outer circumferential surface of the insulator base, each of the connection wires connecting adjacent ones of the coils of a corresponding one of the phases. The outer circumferential surface of the insulator base includes a locking surface including accommodation grooves, each accommodating a corresponding one of the connection wires and a non-locking surface that does not include the accommodation grooves or lock the connection wires. The stator core includes an engagement recess that engages with part of a jig, the engagement recess being located in a region outward from the insulator base in the radial direction on the end face of the yoke. The engagement recess is located outward from the non-locking surface in the radial direction on the end face of the yoke.

A method for manufacturing a motor-driven compressor according to an aspect of the present disclosure is provided. The motor-driven compressor includes a compression portion configured to compress fluid, an electric motor configured to drive the compression portion, and a tubular housing that accommodates the electric motor. The electric motor includes a stator. The stator includes an annular stator core including a cylindrical yoke that engages with an inner circumferential surface of the housing and teeth that extend in a radial direction from an inner circumferential surface of the yoke, an annular insulator including a tubular insulator base that is in contact with an end face of the yoke, and U-, V-, and W-phase windings, each being wound around corresponding ones of the teeth in a concentrated manner so as to form coils. The winding of each of the phases forms connection wires that are locked on an outer circumferential surface of the insulator base, each of the connection wires connecting adjacent ones of the coils of a corresponding one of the phases. The outer circumferential surface of the insulator base includes a locking surface including accommodation grooves, each accommodating a corresponding one of the connection wires and a non-locking surface that does not include the accommodation grooves or lock the connection wires. The stator core includes an engagement recess that engages with part of a jig, the engagement recess being located in a region outward from the insulator base in the radial direction on the end face of the yoke. The engagement recess is located outward from the non-locking surface in the radial direction on the end face of the yoke. The method includes positioning the stator in a circumferential direction of the housing while engaging the engagement recess with part of a portion of the jig facing the non-locking surface in a radial direction of the stator core.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to an embodiment will now be described with reference to FIGS. 1 to 9.
Entire Structure of Motor-Driven Compressor 10

Figure 1:
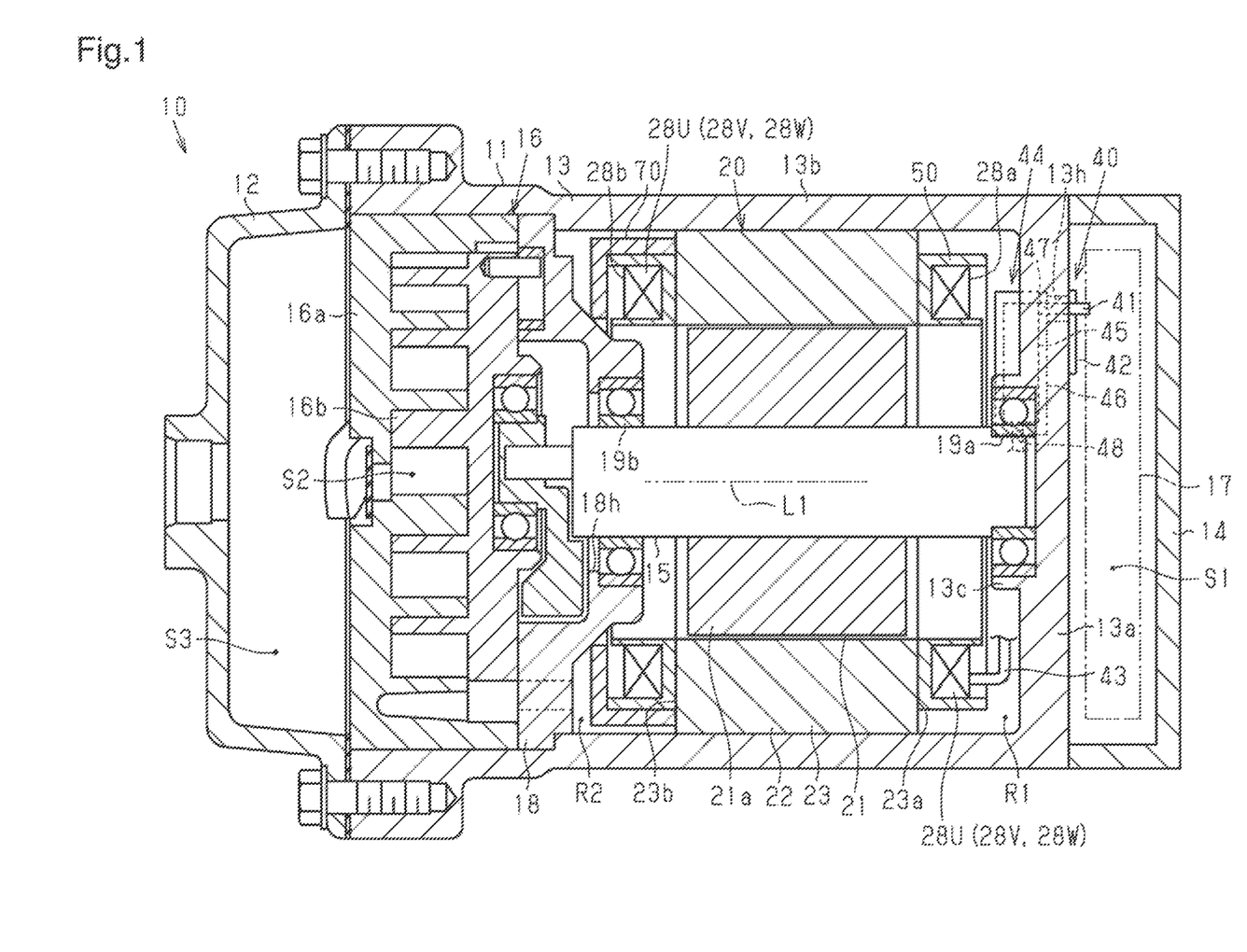
FIG. 1 is a cross-sectional side view showing a motor-driven compressor according to an embodiment.

As shown in FIG. 1, the motor-driven compressor 10 includes a tubular housing 11. The housing 11 includes a discharge housing member 12, a motor housing member 13, and an inverter case 14. The discharge housing member 12, motor housing member 13, and inverter case 14 are made of metal. The discharge housing member 12, motor housing member 13, and inverter case 14 are made of, for example, aluminum.

The motor housing member 13 includes a flat end wall 13a and a tubular circumferential wall 13b extending from an outer circumferential portion of the end wall 13a. The discharge housing member 12 is tubular. The discharge housing member 12 is coupled to an opening end of the circumferential wall 13b. The inverter case 14 is tubular. The inverter case 14 is coupled to the end wall 13a of the motor housing member 13. The end wall 13a of the motor housing member 13 and the inverter case 14 define an accommodation space S1.

The end wall 13a of the motor housing member 13 includes a middle portion with a cylindrical boss 13c. The axis of the boss 13c coincides with the axis of the circumferential wall 13b of the motor housing member 13. The end wall 13a has a through-hole 13h. The through-hole 13h extends through the end wall 13a in its thickness direction. The through-hole 13h is located in a radial direction of the end wall 13a between the boss 13c and circumferential wall 13b.

The motor-driven compressor 10 includes a rotary shaft 15, a compression portion 16, an electric motor 20, and an inverter 17. The rotary shaft 15, compression portion 16, and electric motor 20 are accommodated in the motor housing member 13. Accordingly, the housing 11 accommodates the electric motor 20. The direction in which the rotational axis L1 of the rotary shaft 15, namely, an axial direction of the rotary shaft 15 coincides with an axial direction of the circumferential wall 13b of the motor housing member 13. The inverter 17 is accommodated in the accommodation space S1.

The compression portion 16 includes a fixed scroll 16a and a movable scroll 16b. The fixed scroll 16a is fixed to the motor housing member 13. The movable scroll 16b faces the fixed scroll 16a. The compression portion 16 is driven by rotation of the rotary shaft 15. The driving of the compression portion 16 compresses refrigerant (fluid). A compression chamber S2, the volume of which is variable, is defined between the fixed scroll 16a and the movable scroll 16b. A discharge chamber S3 is defined between the fixed scroll 16a and the discharge housing member 12. After compressed by a change in the volume of the compression chamber S2, the refrigerant is discharged to the discharge chamber S3. The electric motor 20 drives the compression portion 16 by rotating the rotary shaft 15.

The compression portion 16 and the electric motor 20 are laid out in the axial direction of the rotary shaft 15. The electric motor 20 is located between the compression portion 16 and the end wall 13a. The compression portion 16, electric motor 20, and inverter 17 are laid out in this order in the axial direction of the rotary shaft 15.

The motor-driven compressor 10 includes a shaft support 18. The shaft support 18 is located between the compression portion 16 and the electric motor 20. The shaft support 18 is a partition wall between the compression portion 16 and the electric motor 20. The shaft support 18 includes a middle portion having an insertion hole 18h. The axis of the insertion hole 18h coincides with the axis of the boss 13c. One end of the rotary shaft 15 is inserted through the insertion hole 18h. A radial bearing 19b is disposed between that end of the rotary shaft 15 and an inner circumferential surface of the insertion hole 18h. That end of the rotary shaft 15 is rotationally supported by the shaft support 18 with the radial bearing 19b. The other end of the rotary shaft 15 is inserted into the boss 13c. A radial bearing 19a is disposed between the other end of the rotary shaft 15 and the boss 13c. The other end of the rotary shaft 15 is rotationally supported by the boss 13c with the radial bearing 19a.

Structure of Electric Motor 20

Figure 2:
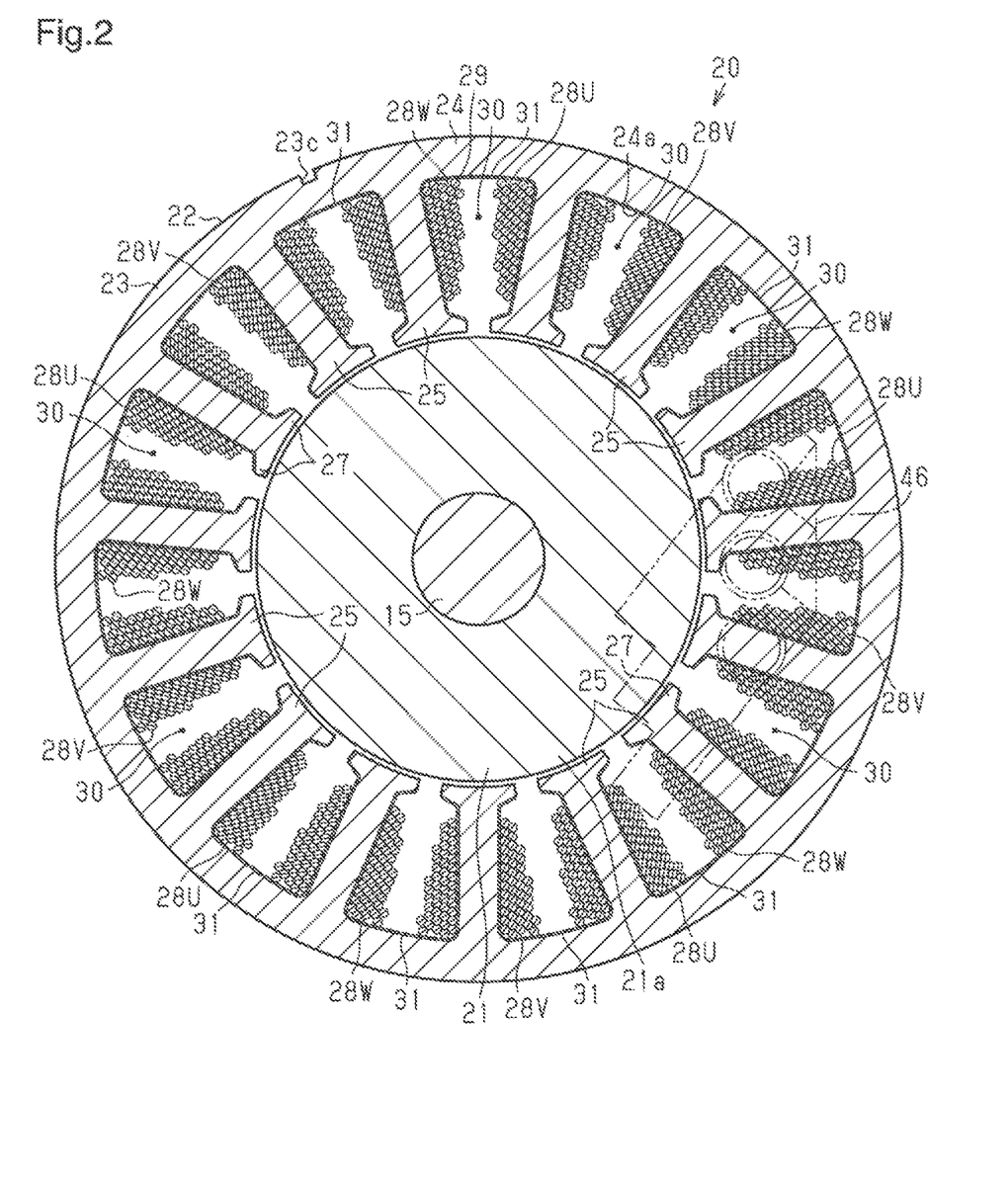
FIG. 2 is a cross-sectional view of the electric motor shown in FIG. 1.

The electric motor 20 includes a rotor 21 and a stator 22. The rotor 21 is located in the stator 22. The rotor 21 includes a cylindrical rotor core 21a. The rotor core 21a is fixed to the rotary shaft 15. Permanent magnets (not shown) are embedded in the rotor core 21a.

The stator 22 includes an annular stator core 23. The stator core 23 is fixed to the inner circumferential surface of the circumferential wall 13b of the motor housing member 13. Thus, the stator core 23 is fixed to the inner circumferential surface of the housing 11. The stator 22 is coupled to the housing 11 by fitting the stator core 23 to the inner circumferential surface of the circumferential wall 13b through, for example, shrink-fitting.

The stator core 23 includes a first end face 23a and a second end face 23b. The first end face 23a and the second end face 23b are directed in opposite orientations in an axial direction of the stator core 23. The stator core 23 is located in the motor housing member 13 such that the first end face 23a faces the end wall 13a of the motor housing member 13. Thus, the first end face 23a is located closer to the inverter 17 than the second end face 23b. The second end face 23b is located closer to the compression portion 16 than the first end face 23a.

Figure 3:
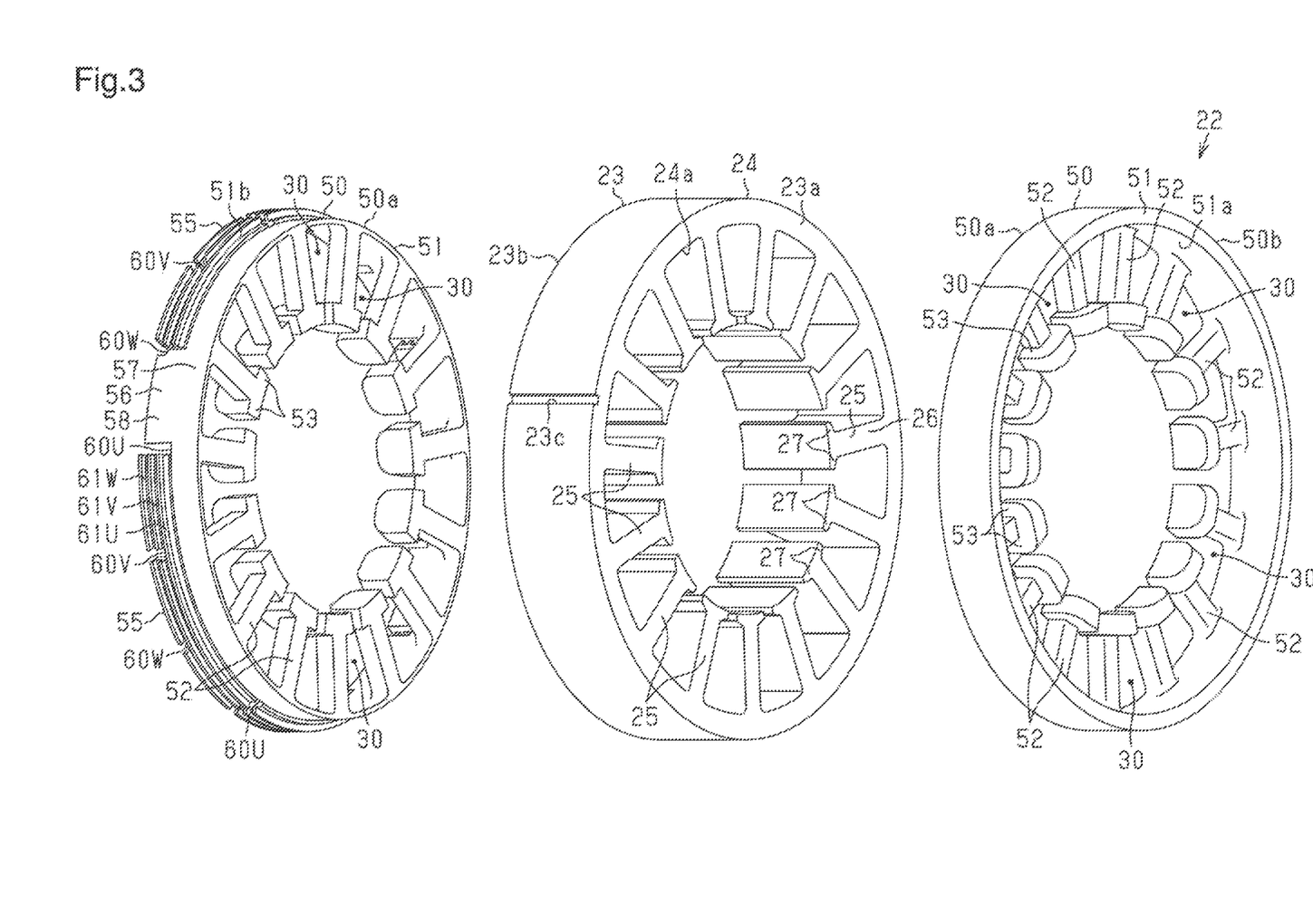
FIG. 3 is an exploded perspective view of the stator core and the insulators shown in FIG. 2.

As shown in FIGS. 2 and 3, the stator core 23 includes a cylindrical yoke 24 and teeth 25. The teeth 25 extend toward the radially inner side of the yoke 24 from an inner circumferential surface 24a of the yoke 24. In the present embodiment, the stator core 23 includes fifteen teeth 25. The yoke 24 engages with the inner circumferential surface of the housing 11.

The teeth 25 are spaced apart from each other in a circumferential direction of the yoke 24. The teeth 25 are arranged at regular intervals in the circumferential direction of the yoke 24. The circumferential direction of the yoke 24 corresponds to a circumferential direction of the stator core 23. The teeth 25 extend from the inner circumferential surface 24a of the yoke 24 toward the axis of the stator core 23. Each tooth 25 includes a tooth extension 26 and a tooth flange 27. The tooth extension 26 extends from the inner circumferential surface 24a of the yoke 24. The tooth flange 27 protrudes from the tip of the tooth extension 26 toward the opposite sides of the stator core 23 in the circumferential direction.

As shown in FIGS. 1 and 2, the stator 22 includes U-, V-, and W-phase coils 28U, 28V, 28W. Each of the three-phase coils 28U, 28V, 28W is formed by winding a winding 29 around the corresponding teeth 25 in a concentrated manner. Thus, the stator 22 includes U-, V-, and W-phase windings 29, and the winding 29 of each phase is wound around the corresponding teeth 25 in a concentrated manner so as to form the U-, V-, and W-phase coils 28U, 28V, 28W. A first coil end 28a, which is part of each of the three-phase coils 28U, 28V, 28W, protrudes from the first end face 23a of the stator core 23. A second coil end 28b, which is part of each of the three-phase coils 28U, 28V, 28W, protrudes from the second end face 23b of the stator core 23. Accordingly, the coils 28U, 28V, 28W of their respective phases include the first coil end 28a, which protrudes from the first end face 23a of the stator core 23, and the second coil end 28b, which protrudes from the second end face 23b of the stator core 23.

As shown in FIG. 1, the motor-driven compressor 10 includes motor wires 43. The motor wires 43 are pulled out of the electric motor 20. The motor wires 43 are pulled out of the first coil end 28a of the coils 28U, 28V, 28W of their respective phases. Each one of the motor wires 43 is pulled out of the electric motor 20 in correspondence with the corresponding one of the three phases. Thus, three motor wires 43 are pulled out of the electric motor 20. FIG. 1 shows only one motor wire 43.

The housing 11 includes a first region R1 where the first coil end 28a is located and a second region R2 where the second coil end 28b is located. The first region R1 is located in the motor housing member 13 between the first end face 23a of the stator core 23 and the end wall 13a of the motor housing member 13. The second region R2 is located in the motor housing member 13 between the second end face 23b of the stator core 23 and the shaft support 18.

As shown in FIG. 2, a slot 30 is formed between adjacent ones of the teeth 25 in the circumferential direction of the stator core 23. Each of the three-phase coils 28U, 28V, 28W includes a portion passing through the corresponding slot 30. In the present embodiment, the stator 22 has fifteen slots. The portion of each of the coils 28U, 28V, 28W that passes through the corresponding slot 30 is insulated from the stator core 23 by a slot insulating sheet 31.

Structure of Insulators 50

As shown in FIGS. 1 and 3, the stator 22 includes annular insulators 50. Each insulator 50 insulates the stator core 23 from the coils 28U, 28V, 28W. The insulators 50 are located on the first end face 23a and the second end face 23b of the stator core 23. Thus, the stator 22 includes two insulators 50. Each insulator 50 includes a first surface 50a in contact with the stator core 23 and a second surface 50b located opposite the stator core 23. One of the two insulators 50, namely, the first insulator 50 is located on the stator core 23 with its first surface 50a in contact with the first end face 23a of the stator core 23. The other one of the two insulators 50, namely, the second insulator 50 is located on the stator core 23 with its first surface 50a in contact with the second end face 23b of the stator core 23. The insulators 50 are located between the shaft support 18 and the motor housing member 13.

Each insulator 50 includes a cylindrical insulator base 51, insulator extensions 52, and insulator flanges 53. The insulator base 51 is located at a position facing the yoke 24 in the axial direction of the stator core 23. Each insulator 50 is located on the stator core 23, with an axial direction of the insulator base 51 coinciding with the axial direction of the yoke 24. The insulator base 51 is in contact with the end face of the yoke 24. The outer diameter of the insulator base 51 is smaller than the outer diameter of the yoke 24. The inner diameter of the insulator base 51 is equal to the inner diameter of the yoke 24.

The insulator base 51 of the first insulator 50 is located on the first end face 23a of the stator core 23, with the insulator base 51 surrounding the first coil end 28a. The insulator base 51 of the second insulator 50 is located on the second end face 23b of the stator core 23, with the insulator base 51 surrounding the second coil end 28b. Thus, the second insulator 50 includes the tubular insulator base 51 located on the second end face 23b of the stator core 23, with the insulator base 51 surrounding the second coil end 28b.

Each insulator extension 52 extends in the radial direction from an inner circumferential surface 51a of the insulator base 51. Each insulator extension 52 has a width in a circumferential direction of the insulator base 51 that is equal to the width of the corresponding tooth extension 26 in the circumferential direction of the stator core 23. Each insulator extension 52 is in contact with the corresponding tooth 25. Each insulator flange 53 protrudes from the tip of the corresponding insulator extension 52 in a direction intersecting the extending direction of the insulator extension 52.

Figure 4:
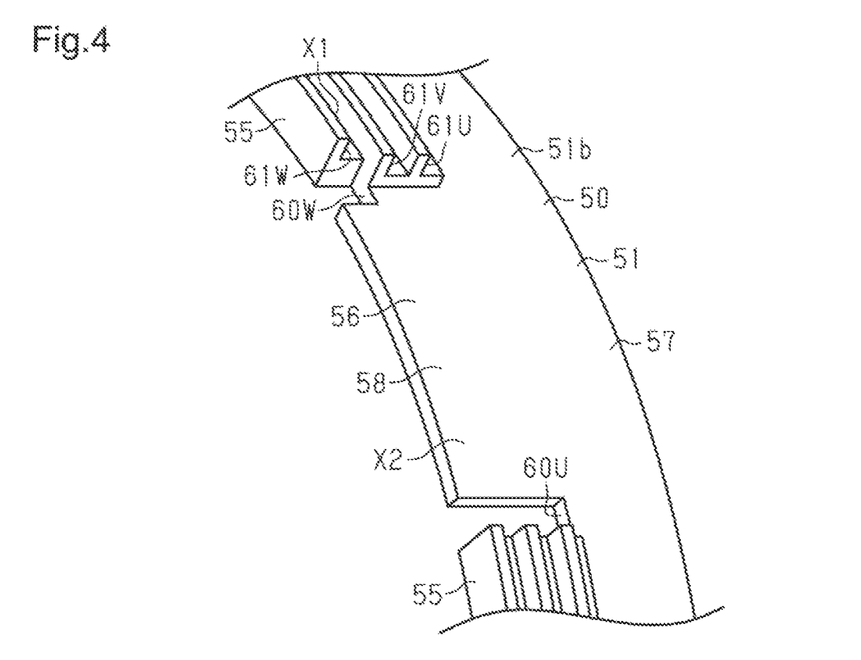
FIG. 4 is an enlarged perspective view showing part of an insulator shown in FIG. 3.
Figure 5:
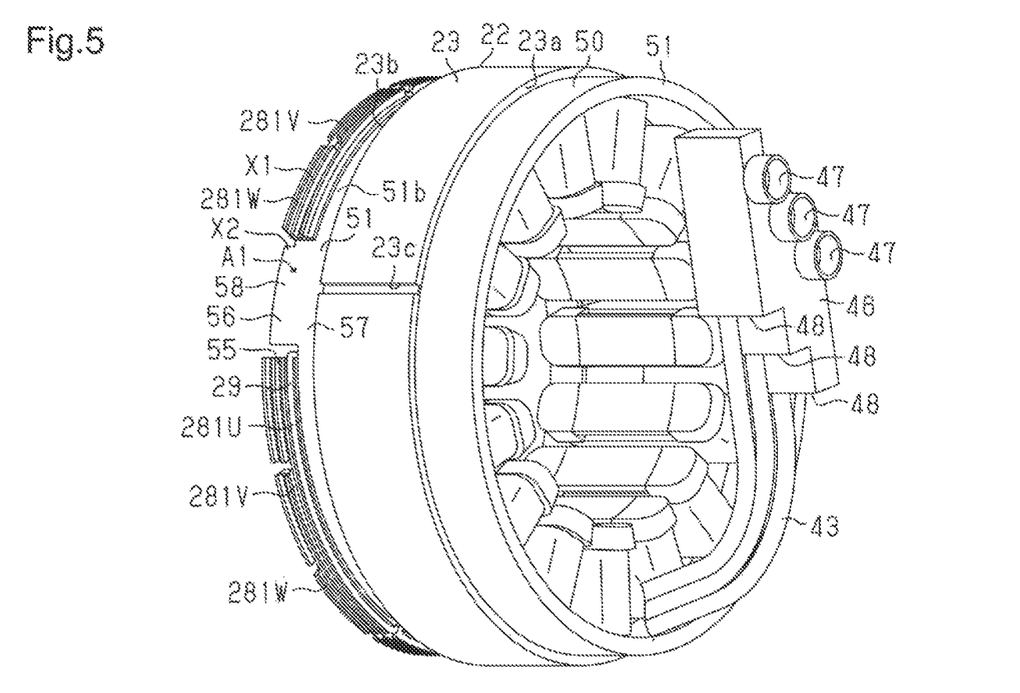
FIG. 5 is a perspective view showing a state where each connection wire is accommodated in the corresponding accommodation groove of the insulator shown in FIG. 3.

As shown in FIGS. 3, 4, and 5, the insulator base 51 of the second insulator 50 includes a thick portion 55 and a thin portion 56. The thick portion 55 is a portion of the insulator base 51 located closer to the second surface 50b of the second insulator 50. The thick portion 55 is continuous with the second surface 50b. The thick portion 55 extends in the circumferential direction of the insulator base 51, with part of the thick portion 55 excluded in the circumferential direction of the insulator base 51. The thick portion 55 does not have an endless annular shape. The thick portion 55 includes through-grooves 60U, 60V, 60W. The number of the through-grooves 60U, 60V, 60W is five for each phase. The through-grooves 60U, 60V, 60W extend from the second surface 50b of the second insulator 50 in the axial direction of the insulator base 51 and extend through the insulator base 51 in its radial direction.

The outer circumferential surface of the thick portion 55 includes three accommodation grooves 61U, 61V, 61W. The three accommodation grooves 61U, 61V, 61W extend in the circumferential direction on the outer circumferential surface of the thick portion 55. The three accommodation grooves 61U, 61V, 61W are laid out in the axial direction of the insulator base 51 on the outer circumferential surface of the thick portion 55. The three accommodation grooves 61U, 61V, 61W do not extend through the thick portion 55.

The thin portion 56 does not include the accommodation grooves 61U, 61V, 61W, and is thinner than the thick portion 55. The thin portion 56 includes a first thin portion 57 and a second thin portion 58. The first thin portion 57 is a portion of the insulator base 51 located closer to the first surface 50a of the second insulator 50 than the thick portion 55. The first thin portion 57 extends over the entire insulator base 51 in its circumferential direction. The first thin portion 57 is continuous with the first surface 50a. The second thin portion 58 is a portion of the insulator base 51 located closer to the second surface 50b of the second insulator 50 than the first thin portion 57 and located between the ends of the thick portion 55 in the circumferential direction of the insulator base 51. The second thin portion 58 is continuous with the second surface 50b. The second thin portion 58 is continuous with part of the first thin portion 57. The first thin portion 57 has the same thickness as the second thin portion 58.

Structure of Winding 29

Figure 6:
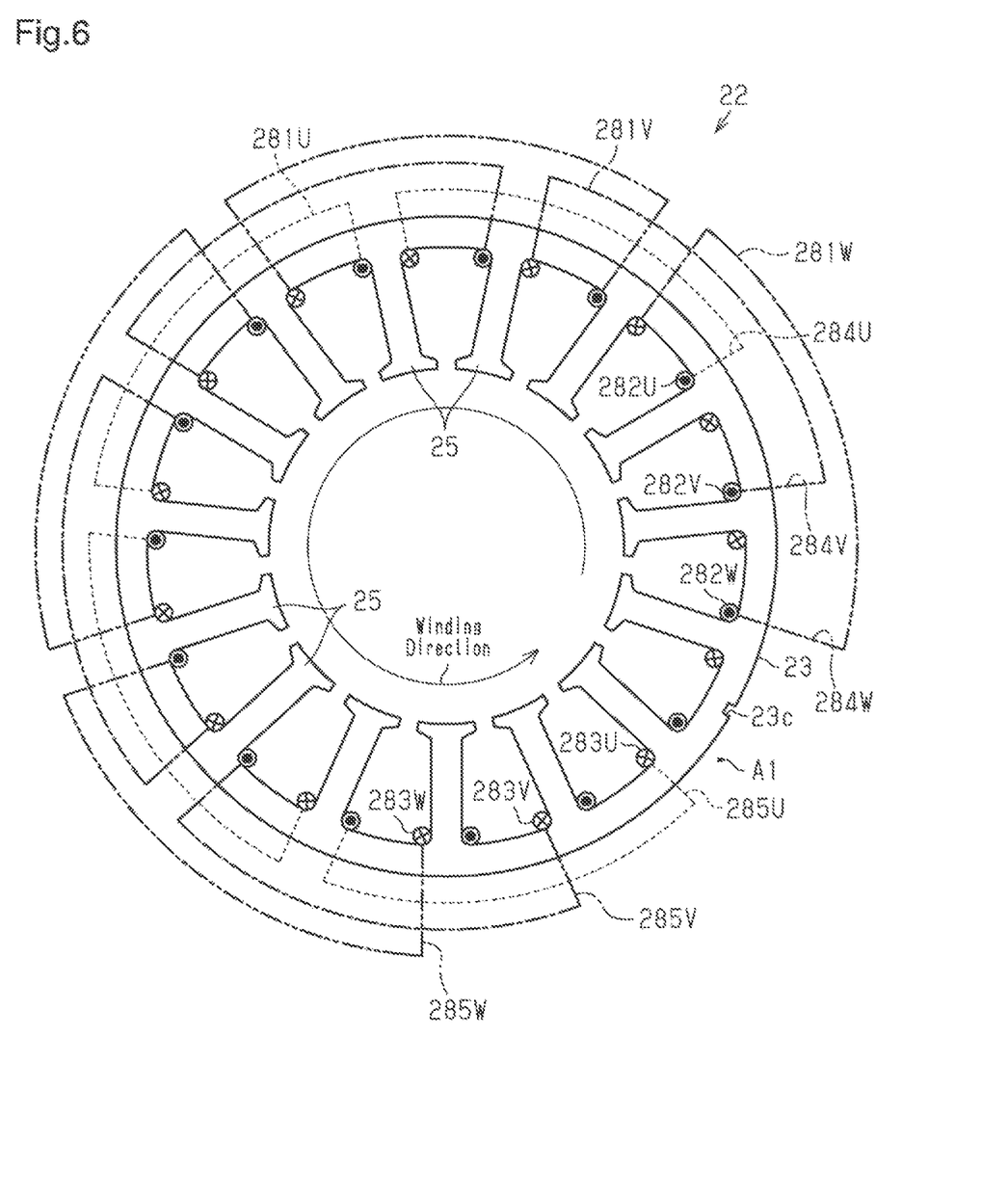
FIG. 6 is a schematic diagram showing how the windings are wound around the stator core shown in FIG. 3.

As shown in FIGS. 5 and 6, the coils 28U, 28V, 28W of their respective phases are formed in series. In series windings, first, the winding 29 of each phase starts to be wound around the corresponding tooth extension 26. Then, the winding 29 of each phase is sequentially wound around the corresponding tooth extensions 26, which are arranged such that two other tooth extensions 26 are located between them in the circumferential direction of the stator core 23, in a concentrated manner. Thus, the coils 28U, 28V, 28W of their respective phases are arranged with the two teeth 25 located in between in the circumferential direction of the stator core 23. The windings 29 are each wound around a portion including the corresponding tooth extension 26 and including two insulator extensions 52 that are arranged on opposite sides of that tooth extension 26. In the present embodiment, the coils 28U, 28V, 28W of the three phases each include five coils. The coils 28U, 28V, 28W of the three phases are each arranged adjacent to a coil of a different phase, in the circumferential direction of the stator core 23, in the corresponding slot 30.

Adjacent ones of the U-phase coil 28U in the circumferential direction of the stator core 23 are connected to each other by a connection wire 281U. The connection wire 281U is part of the winding 29 pulled out of the second coil end 28b and located in the second region R2. The connection wire 281U extends in the circumferential direction of the stator core 23 at a position facing the second end face 23b of the stator core 23. Adjacent ones of the V-phase coil 28V in the circumferential direction of the stator core 23 are connected to each other by a connection wire 281V. The connection wire 281V is part of the winding 29 pulled out of the second coil end 28b and located in the second region R2. The connection wire 281V extends in the circumferential direction of the stator core 23 at a position facing the second end face 23b of the stator core 23. Adjacent ones of the W-phase coil 28W in the circumferential direction of the stator core 23 are connected to each other by a connection wire 281W. The connection wire 281W is part of the winding 29 pulled out of the second coil end 28b and located in the second region R2. The connection wire 281W extends in the circumferential direction of the stator core 23 at a position facing the second end face 23b of the stator core 23. In this manner, for their respective phases, adjacent ones of the coils 28U, 28V, 28W in the circumferential direction of the stator core 23 are each connected by the connection wires 281U, 281V, 281W. The connection wires 281U, 281V, 281W of their respective phases are located in the second region R2 and thus accommodated in an annular space between the shaft support 18 and the motor housing member 13.

Referring to FIG. 6, the coils 28U, 28V, 28W of their respective phases are each formed around a corresponding tooth 25. Then, the connection wire (i.e., each one of the connection wires 281U, 281V, 281W) extending from its respective coil (i.e., the corresponding one of the coils 28U, 28V, 28W) is extended in a winding direction (the counterclockwise direction in FIG. 6) toward the next corresponding tooth 25 (i.e., every third tooth 25) in the circumferential direction of the stator core 23. The three-phase connection wires 281U, 281V, 281W are extended toward their next corresponding tooth 25 in the same direction (the winding direction). In this manner, the three-phase coils 28U, 28V, 28W are sequentially formed in the same winding direction.

Of the coils 28U, 28V, 28W of their respective phases, the first ones to be formed are respectively referred to as starting coils 282U, 282V, 282W whereas the final ones to be formed are respectively referred to as ending coils 283U, 283V, 283W. That is, the coils 28U, 28V, 28W of their respective phases include the starting coils 282U, 282V, 282W, each of which is a winding start of a series winding, and the ending coils 283U, 283V, 283W, each of which is a winding end of the series winding. The three-phase starting coils 282U, 282V, 282W are adjacent to each other in the circumferential direction of the stator core 23. The three-phase ending coils 283U, 283V, 283W are adjacent to each other in the circumferential direction of the stator core 23. In the present embodiment, the W-phase starting coil 282W and the U-phase ending coil 283U are adjacent to each other in the circumferential direction of the stator core 23. In the circumferential direction of the stator core 23, no connection wires 281U, 281V, 281W are arranged between the W-phase starting coil 282W and the U-phase ending coil 283U.

Referring to FIGS. 5 and 6, the connection wires 281U, 281V, 281W are pulled out of the second coil end 28b and each pass through the corresponding one of the through-grooves 60U, 60V, 60W. The connection wires 281U, 281V, 281W are each accommodated in the corresponding one of the accommodation grooves 61U, 61V, 61W and are locked on the outer circumferential surface of the thick portion 55. This avoids the contact of the three-phase connection wires 281U, 281V, 281W with each other. In an outer circumferential surface 51*b* of the insulator base 51, the outer circumferential surface of the thick portion 55 is a locking surface X1 that includes the accommodation grooves 61U, 61V, 61W, each accommodating the corresponding one of the connection wires 281U, 281V, 281W.

The U-phase winding 29 includes multiple coils 28U and multiple connection wires 281U. The connection wires 281U each connect adjacent ones of the coils 28U, and are locked on the outer circumferential surface 51*b* of the insulator base 51. The V-phase winding 29 includes multiple coils 28V and multiple connection wires 281V. The connection wires 281V each connect adjacent ones of the coils 28V, and are locked on the outer circumferential surface 51*b* of the insulator base 51. The W-phase winding 29 includes multiple coils 28W and multiple connection wires 281W. The connection wires 281W each connect adjacent ones of the coils 28W, and are locked on the outer circumferential surface 51*b* of the insulator base 51.

The connection wires 281U include a starting connection wire 284U and an ending connection wire 285U that connect to the starting coil 282U and the ending coil 283U, respectively. The connection wires 281V include a starting connection wire 284V and an ending connection wire 285V that connect to the starting coil 282V and the ending coil 283V, respectively. The connection wires 281W include a starting connection wire 284W and an ending connection wire 285W that connect to the starting coil 282W and the ending coil 283W, respectively.

The connection wires 281U, 281V, 281W extend in the circumferential direction of the stator core 23, with each of the connection wires 281U, 281V, 281W accommodated in the corresponding one of the accommodation grooves 61U, 61V, 61W. The outer circumferential surface of the second thin portion 58 is a non-locking surface X2 that does not include the accommodation grooves 61U, 61V, 61W or lock any one of the connection wires 281U, 281V, 281W. In the circumferential direction of the insulator base 51, the non-locking surface X2 is located between the starting connection wire 284W and the ending connection wire 285U, which connect to the starting coil 282W and the ending coil 283U, respectively.

Engagement Groove 23*c*

Figure 7:
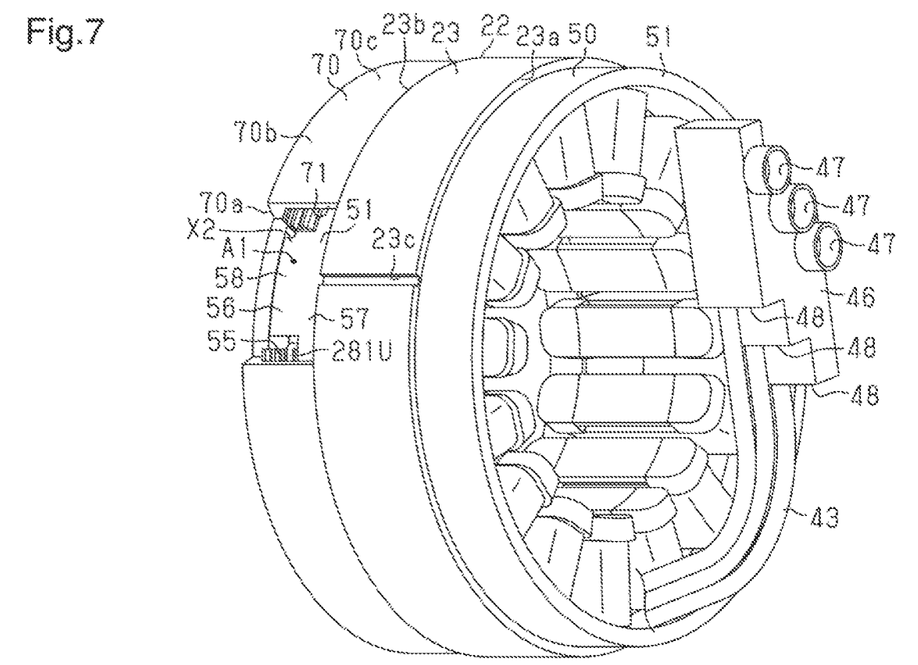
FIG. 7 is a perspective view showing a state where the cover is located on the insulator shown in FIG. 3.
Figure 8:
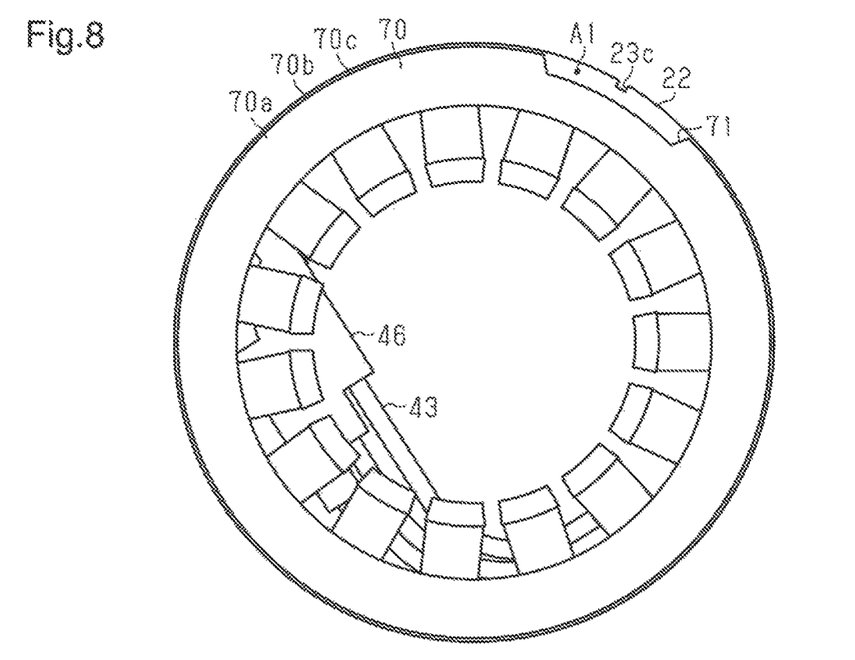
FIG. 8 is a front view showing a state in which the stator of FIG. 2 is viewed from the second end face of the stator core.

As shown in FIGS. 7 and 8, the stator core 23 includes an engagement groove 23*c* that is an engagement recess. The engagement groove 23*c* is located on the outer circumferential surface of the stator core 23. The engagement groove 23*c* extends in the axial direction of the stator core 23. One end of the engagement groove 23*c* opens in the first end face 23*a* of the stator core 23. The other end of the engagement groove 23*c* opens in the second end face 23*b* of the stator core 23. When the stator 22 is viewed facing the second end face 23*b* in the axial direction of the stator core 23, the engagement groove 23*c* is located in a phase range A1 that includes the non-locking surface X2. Thus, when the stator 22 is viewed facing the second end face 23*b* in the axial direction of the stator core 23, the engagement groove 23*c* and part of the thin portion 56 are located in the phase range A1. Accordingly, when the second end face 23*b* of the stator core 23 is viewed in the axial direction of the stator core 23, the engagement groove 23*c* is located between the starting connection wire 284W and the ending connection wire 285U in the circumferential direction of the stator core 23. When the stator 22 is viewed facing the second end face 23*b* in the axial direction of the stator core 23, the engagement groove 23*c* is located outward from the non-locking surface X2 in the radial direction of the stator core 23.

Structure of Cover 70

The stator 22 further includes an insulative tubular cover 70. The cover 70 includes an end wall 70*a* and a tubular circumferential wall 70*b* that extends from an outer circumferential portion of the end wall 70*a*. The cover 70 is located on the insulator 50, with the circumferential wall 70*b* surrounding the insulator base 51. The circumferential wall 70*b* of the cover 70 is located between the connection wires 281U, 281V, 281W and the circumferential wall 13*b* of the motor housing member 13. Thus, the cover 70 is located between the connection wires 281U, 281V, 281W and the housing 11, and surrounds the insulator base 51.

The cover 70 includes a notch 71. The notch 71 is formed on an outer circumferential surface 70*c* of the cover 70. The notch 71 extends through the cover 70 in an axial direction of the cover 70. Thus, the cover 70 includes the notch 71 extending through the cover 70 and located on the outer circumferential surface 70*c*. The cover 70 is located such that the notch 71 overlaps the phase range A1 in the axial direction of the stator core 23. Thus, the notch 71 and part of the thin portion 56 are laid out in the radial direction of the stator core 23. When the stator 22 is viewed facing the second end face 23*b* in the axial direction of the stator core 23, the engagement groove 23*c* is located in the notch 71. Thus, when the second end face 23*b* of the stator core 23 is viewed in the axial direction of the stator core 23, at least part of the engagement groove 23*c* is located in the notch 71.

Structure of Hermetic Terminal 40

As shown in FIG. 1, the motor-driven compressor 10 includes a hermetic terminal 40. The hermetic terminal 40 is accommodated in the housing 11. The hermetic terminal 40 includes three conductive members 41 that correspond to the three-phase coils 28U, 28V, 28W, respectively. FIG. 1 shows only one conductive member 41. Each conductive member 41 is a columnar metal terminal that extends straight. One end of each conductive member 41 is electrically connected to the inverter 17 in the accommodation space S1. The other end of each conductive member 41 protrudes through the through-hole 13*h* from the accommodation space S1 into the motor housing member 13. The hermetic terminal 40 includes a support plate 42. The support plate 42 supports the three conductive members 41, with the conductive members 41 insulated from each other. In the accommodation space S1, the support plate 42 is fixed to a surrounding part of the through-hole 13*h* on the outer surface of the end wall 13*a*.

Structure of Connector 44

The motor housing member 13 accommodates a connector 44. The connector 44 is located in the first region R1. The connector 44 includes three connection terminals 45 and an insulative cluster block 46. The connection terminals 45 correspond to the three-phase coils 28U, 28V, 28W, respectively. The cluster block 46 accommodates the three connection terminals 45. Thus, the cluster block 46 is located in the first region R1.

The cluster block 46 includes three conductive member through-holes 47 and three motor wire through-holes 48. FIG. 1 shows only one conductive member through-hole 47 and only one motor wire through-hole 48. Each conductive member 41 is inserted into the corresponding conductive member through-hole 47. Each motor wire 43 is inserted into the corresponding motor wire through-hole 48. Each connection terminal 45 electrically connects the corresponding conductive member 41 to the corresponding motor wire 43. The cluster block 46 is located in the motor housing member 13 such that the conductive member through-holes 47 extend in the axial direction of the rotary shaft 15.

The power from the inverter 17 is supplied to the electric motor 20 via the conductive members 41, connection terminals 45, and motor wires 43 so as to drive the electric motor 20. Thus, the inverter 17 drives the electric motor 20. The driving of the electric motor 20 drives the compression portion 16 and causes the compression portion 16 to compress refrigerant.

Relationship between Engagement Groove 23*c* and Engagement Projection 83 of Jig 80

Figure 9:
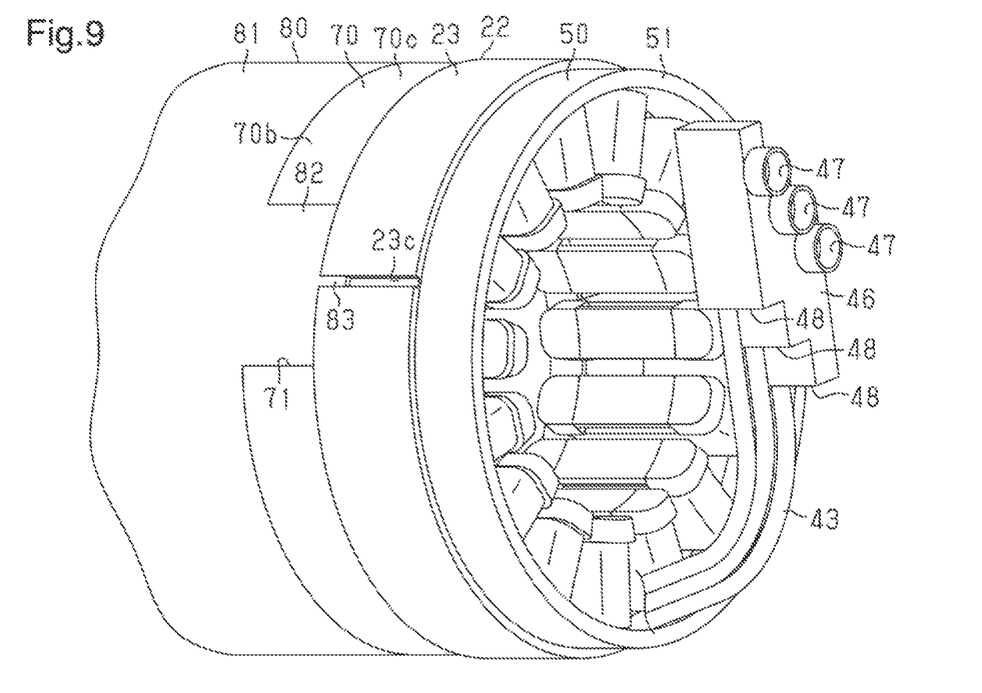
FIG. 9 is a perspective view illustrating the relationship between the stator shown in FIG. 2 and a jig.

As shown in FIG. 9, in the case of shrink-fitting the stator core 23 to the motor housing member 13, a jig 80 is used to position the stator core 23 relative to the motor housing member 13 in the circumferential direction. The jig 80 includes a columnar body 81, a plate-shaped attachment 82, and an elongated plate-shaped engagement projection 83. The attachment 82 protrudes from part of the edge of the outer circumference of one end face of the body 81. The engagement projection 83 is an engagement portion that protrudes from the tip of the attachment 82. The engagement projection 83 is engageable with the engagement groove 23*c* of the stator core 23. Thus, the stator core 23 includes the engagement groove 23*c*, which engages with the engagement projection 83 of the jig 80, which is used to insert the stator 22 into the housing 11, in a region of the end face of the yoke 24 located outward from the insulator base 51 in the radial direction.

The jig 80 is attached to the stator 22, with the axis of the body 81 coinciding with the axial direction of the stator core 23. The attachment 82 is attached along the notch 71 of the cover 70. The length of the engagement projection 83 is set such that the engagement projection 83 is engageable with the engagement groove 23*c* of the stator core 23 when the attachment 82 is attached to the notch 71.

Operation

The operation of the present embodiment will now be described, together with the method for manufacturing the motor-driven compressor 10 of the present embodiment. In this description, the method for manufacturing the motor-driven compressor 10 is a method for coupling the stator 22 to the motor housing member 13.

The stator 22 is coupled to the housing 11 by fitting the stator core 23 to the inner circumferential surface of the motor housing member 13 through, for example, shrink-fitting. In the shrink-fitting, the motor housing member 13 is thermally expanded so that the inner diameter of the motor housing member 13 becomes larger than the outer diameter of the stator core 23. Subsequently, the stator core 23 is inserted into the motor housing member 13 to reach a predetermined shrink-fitting position. Then, as the temperature of the motor housing member 13 becomes closer to normal temperature, the motor housing member 13 shrinks. This brings the inner circumferential surface of the motor housing member 13 into close contact with the outer circumferential surface of the stator core 23.

In the case of shrink-fitting the stator core 23 to the motor housing member 13, the jig 80 is used to position the stator core 23 relative to the motor housing member 13 in the circumferential direction such that no phase deviation occurs in the stator core 23 relative to the motor housing member 13. The stator 22 is positioned relative to the housing 11 in the circumferential direction by pushing the stator 22 into the housing 11 with the jig 80 while engaging the engagement groove 23*c* with the engagement projection 83, which is located in the jig 80 facing the non-locking surface X2 in the radial direction of the stator core 23.

When the stator 22 is viewed facing the second end face 23*b* of the stator core 23 in the axial direction of the stator core 23, the engagement groove 23*c* is located in the phase range A1, which includes the non-locking surface X2. The engagement groove 23*c* is located outward from the non-locking surface X2 in the radial direction of the stator core 23. This avoids the interference of the three-phase connection wires 281U, 281V, 281W with the engagement projection 83 of the jig 80.

Additionally, the cover 70 surrounds the insulator base 51. Thus, the contact of the connection wires 281U, 281V, 281W with the housing 11 is avoided even when, for example, each of the connection wires 281U, 281V, 281W is forced out of the corresponding one of the accommodation grooves 61U, 61V, 61W. This ensures the insulation between the housing 11 and the connection wires 281U, 281V, 281W.

The cover 70 includes the notch 71. The notch 71 and the non-locking surface X2 are laid out in the radial direction of the stator core 23. Further, when the stator 22 is viewed facing the second end face 23*b* of the stator core 23 in the axial direction of the stator core 23, the engagement groove 23*c* is located in the notch 71. Thus, even when the stator 22 includes the cover 70 that surrounds the insulator base 51, the cover 70 avoids closing the engagement groove 23*c*. This facilitates the engagement of the engagement projection 83 of the jig 80 with the engagement groove 23*c* while viewing the stator 22 such that the stator 22 faces the second end face 23*b* in the axial direction of the stator core 23.

The above-described embodiment provides the following advantages.

(1) The non-locking surface X2 of the insulator base 51 does not include the accommodation grooves 61U, 61V, 61W or lock the connection wires 281U, 281V, 281W. Such a structure avoids the interference of the connection wires 281U, 281V, 281W with the jig 80 during engagement of the jig 80 with the engagement groove 23*c*. This facilitates the engagement of the engagement projection 83 of the jig 80 with the engagement groove 23*c* while viewing the stator 22 such that the stator 22 faces the second end face 23*b* in the axial direction of the stator core 23. As a result, the working efficiency of the motor-driven compressor 10 is improved.

(2) When the second end face 23*b* of the stator core 23 is viewed in the axial direction of the stator core 23, the engagement groove 23*c* is located between the starting connection wire 284W and the ending connection wire 285U in the circumferential direction. This eliminates the need to dispose an additional non-locking surface X2 at a position other than the space between the starting connection wire 284W and the ending connection wire 285U. Thus, the non-locking surface X2 is disposed on the insulator base 51 in a favorable manner.

(3) The cover 70 surrounds the insulator base 51. Thus, the contact of the connection wires 281U, 281V, 281W with the housing 11 is avoided even when, for example, each of the connection wires 281U, 281V, 281W is forced out of the corresponding one of the accommodation grooves 61U, 61V, 61W. This ensures the insulation between the housing 11 and the connection wires 281U, 281V, 281W and thus improves the reliability of the motor-driven compressor 10.

The cover 70 includes the notch 71. Further, the notch 71 and part of the non-locking surface X2 are laid out in the radial direction of the stator core 23. Furthermore, when the stator 22 is viewed facing the second end face 23*b* in the axial direction of the stator core 23, the engagement groove 23c is located in the notch 71. Thus, even when the stator 22 includes the cover 70 that surrounds the insulator base 51, the cover 70 avoids closing the engagement groove 23c. Such a structure facilitates the engagement of the engagement projection 83 of the jig 80 with the engagement groove 23c. This improves the working efficiency of the motor-driven compressor 10 while improving its the reliability.

(4) In the present embodiment, increases in the depths of the accommodation grooves 61U, 61V, 61W do not increase the thickness of the portion including the non-locking surface X2 or cause the insulator base 51 to close the engagement groove 23c. Thus, the depths of the accommodation grooves 61U, 61V, 61W are easily set such that each of the connection wires 281U, 281V, 281W is not forced out of the corresponding one of the accommodation grooves 61U, 61V, 61W. This easily provides reliability to the motor-driven compressor 10.

(5) In the present embodiment, in the case of shrink-fitting the stator core 23 to the motor housing member 13, phase deviation in the stator core 23 relative to the motor housing member 13 is prevented from occurring. Accordingly, for example, when each conductive member 41 is connected to the corresponding connection terminal 45 in the cluster block 46, the motor wires 43 avoid projecting excessively or avoid being bent excessively. This prevents the motor wires 43 from receiving excessive load.

(6) For example, the contact of the connection wires 281U, 281V, 281W with the housing 11 is avoided by the cover 70 even when, for example, each of the connection wires 281U, 281V, 281W is forced out of the corresponding one of the accommodation grooves 61U, 61V, 61W. Thus, the thickness of the thick portion 55 is minimized by setting the depths of the accommodation grooves 61U, 61V, 61W such that they can respectively accommodate the connection wires 281U, 281V, 281W to a minimum extent.

(7) An annular space is created between the shaft support 18, which is tapered, and the motor housing member 13. In order to reduce the motor-driven compressor 10 in size, the annular space accommodates the insulators 50, on which the connection wires 281U, 281V, 281W are locked. The jig 80 would be easily inserted into the motor housing member 13 prior to being joined to the shaft support 18 because that motor housing member 13 has an opening. Accordingly, the engagement projection 83 of the jig 80 easily interferes with the connection wires 281U, 281V, 281W. Such interference is avoided by the arrangement of the non-locking surface X2 on the insulator base 51.

Modifications

The above-described embodiment may be modified as follows. The above-described embodiment and the following modifications can be combined as long as the combined modifications remain technically consistent with each other.

Figure 10:
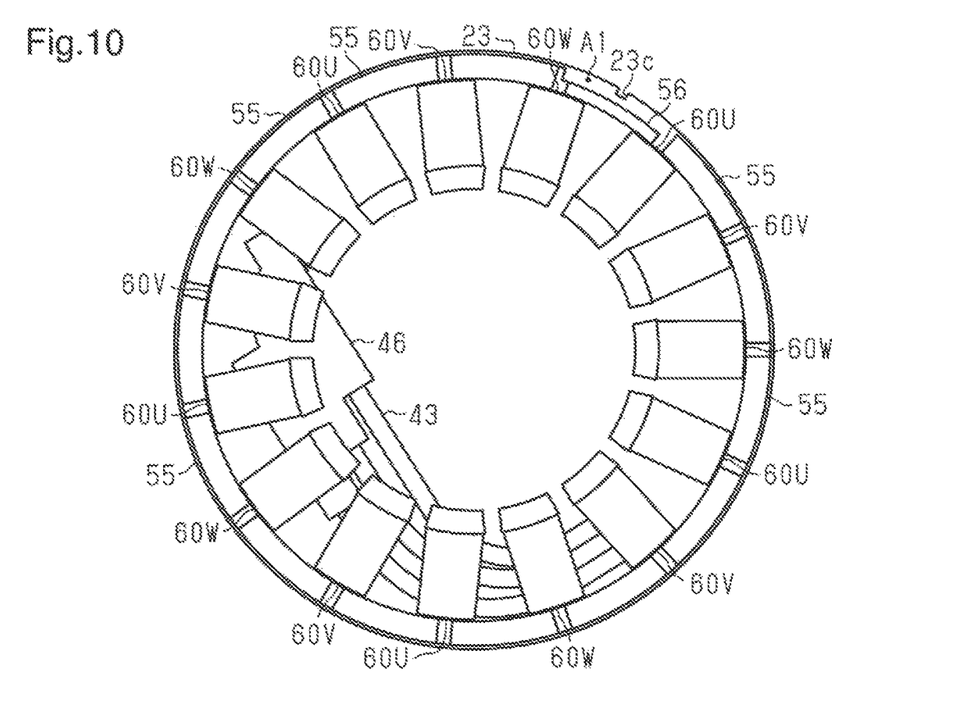
FIG. 10 is a front view showing a state in which the stator according to a modification is viewed from the second end face of the stator core.

As shown in FIG. 10, the stator 22 does not have to include the cover 70. When the stator 22 is viewed facing the second end face 23b in the axial direction of the stator core 23, the engagement groove 23c only needs to be located outward from the non-locking surface X2 in the radial direction of the stator core 23. When the stator 22 does not include the cover 70 in this manner, the depths of the accommodation grooves 61U, 61V, 61W need to be set so as to ensure that the connection wires 281U, 281V, 281W can be respectively accommodated in the accommodation grooves 61U, 61V, 61W.

In the embodiment, the insulator base 51 includes the thick portion 55 and the thin portion 56. Instead, for example, the insulator base 51 may have a constant thickness. The outer circumferential surface 51b of the insulator base 51 only needs to include the locking surface X1 and the non-locking surface X2.

In the embodiment, the number of slots in the stator core 23 may be changed.

In the embodiment, the stator core 23 includes the engagement groove 23c. Instead, the stator core 23 may include, for example, a recess that is recessed from the second end face 23b of the stator core 23. This recess serves as the engagement recess.

In the embodiment, the shape of the cover 70 may be changed. For example, the cover 70 may include only the circumferential wall 70b. The cover 70 only needs to provide insulation between the housing 11 and the connection wires 281U, 281V, 281W by surrounding the insulator base 51.

In the embodiment, a structure may be employed in which the first region R1 is located between the second end face 23b of the stator core 23 and the shaft support 18 and the second region R2 is located between the first end face 23a of the stator core 23 and the end wall 13a of the motor housing member 13.

In the embodiment, a structure may be employed in which the thin portion 56 does not include the first thin portion 57 and the second thin portion 58 extends from the first surface 50a to the second surface 50b of the insulator 50. That is, the insulator base 51 may include a configuration in which only the portion arranged in the phase range A1 is the thin portion 56 when the stator 22 is viewed facing the second end face 23b in the axial direction of the stator core 23.

In the embodiment, in the case of shrink-fitting the stator core 23 to the motor housing member 13, the jig 80 is engaged with the engagement groove 23c such that no phase deviation occurs in the stator core 23 relative to the motor housing member 13. Instead, for example, when the windings 29 are wound around the stator core 23 in an assembly line for the stator 22, the jig 80 may be engaged with the engagement groove 23c in order to position the stator 22 in the circumferential direction. When the motor-driven compressor 10 and the electric motor 20 are manufactured, a configuration only needs to be employed to position the stator 22 in the circumferential direction using with the jig 80 while engaging the engagement groove 23c with part of the portion of the jig 80 facing the non-locking surface X2 in the radial direction of the stator core 23. The jig 80 may be used for any purpose.

The term "annular" as used in this description may refer to any structure that forms a loop, or a continuous shape with no ends, as well as a generally loop-shaped structure with a gap, such as a C-shape. "Annular" shapes include but are not limited to a circular shape, an elliptic shape, and a polygonal shape with sharp or rounded corners. Likewise, "tubular" shapes include but are not limited to any structure having a circular cross-sectional shape, an elliptic cross-sectional shape, and a polygonal cross-sectional shape with sharp or rounded corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor, comprising:
a compression portion configured to compress fluid;
an electric motor configured to drive the compression portion; and
a tubular housing that accommodates the electric motor, wherein
the electric motor includes a stator,
the stator includes:
an annular stator core including a cylindrical yoke that engages with an inner circumferential surface of the housing and teeth that extend in a radial direction from an inner circumferential surface of the yoke;
an annular insulator including a tubular insulator base that is in contact with an end face of the yoke; and
U-, V-, and W-phase windings, each being wound around corresponding ones of the teeth in a concentrated manner so as to form coils,
the winding of each of the phases forms connection wires that are locked on an outer circumferential surface of the insulator base, each of the connection wires connecting adjacent ones of the coils of a corresponding one of the phases,
the outer circumferential surface of the insulator base includes:
a locking surface including accommodation grooves, each accommodating a corresponding one of the connection wires; and
a non-locking surface that does not include the accommodation grooves or lock the connection wires,
the stator core includes an engagement recess that engages with part of a jig, the engagement recess being located in a region outward from the insulator base in the radial direction on the end face of the yoke, and
the engagement recess is located outward from the non-locking surface in the radial direction on the end face of the yoke.

2. The motor-driven compressor according to claim 1, wherein
the coils of each of the phases include:
a starting coil that is a winding start of a series winding; and
an ending coil that is a winding end of the series winding,
the connection wires of each of the phases include:
a starting connection wire connecting to the starting coil; and
an ending connection wire connecting to the ending coil, and
the engagement recess is located between the starting connection wire and the ending connection wire in a circumferential direction when an end face of the stator core is viewed in an axial direction.

3. The motor-driven compressor according to claim 1, wherein
the insulator base includes:
a thick portion including the locking surface; and
a thin portion including the non-locking surface, the thin portion being thinner than the thick portion.

4. The motor-driven compressor according to claim 1, wherein
the stator further includes an insulative tubular cover located between the connection wires and the housing, the cover surrounding the insulator base,
the cover includes an outer circumferential surface with a notch that extends through the cover in an axial direction of the cover,
the notch and the non-locking surface are laid out in a radial direction of the stator core, and
at least part of the engagement recess is located in the notch when the end face of the stator core is viewed in an axial direction of the stator core.

5. A method for manufacturing a motor-driven compressor, wherein
the motor-driven compressor includes:
a compression portion configured to compress fluid;
an electric motor configured to drive the compression portion; and
a tubular housing that accommodates the electric motor,
the electric motor includes a stator,
the stator includes:
an annular stator core including a cylindrical yoke that engages with an inner circumferential surface of the housing and teeth that extend in a radial direction from an inner circumferential surface of the yoke;
an annular insulator including a tubular insulator base that is in contact with an end face of the yoke; and
U-, V-, and W-phase windings, each being wound around corresponding ones of the teeth in a concentrated manner so as to form coils,
the winding of each of the phases forms connection wires that are locked on an outer circumferential surface of the insulator base, each of the connection wires connecting adjacent ones of the coils of a corresponding one of the phases,
the outer circumferential surface of the insulator base includes:
a locking surface including accommodation grooves, each accommodating a corresponding one of the connection wires; and
a non-locking surface that does not include the accommodation grooves or lock the connection wires,
the stator core includes an engagement recess that engages with part of a jig, the engagement recess being located in a region outward from the insulator base in the radial direction on the end face of the yoke,
the engagement recess is located outward from the non-locking surface in the radial direction on the end face of the yoke, and
the method comprises positioning the stator in a circumferential direction of the housing while engaging the engagement recess with part of a portion of the jig facing the non-locking surface in a radial direction of the stator core.

* * * * *